United States Patent
Imai

(10) Patent No.: US 7,002,173 B2
(45) Date of Patent: Feb. 21, 2006

(54) IMAGE RECORDING MEDIUM HAVING SUPPRESSION LAYER FOR SUPPRESSING INTERFACIAL CRYSTALLIZATION

(75) Inventor: Shinji Imai, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 237 days.

(21) Appl. No.: 10/704,913

(22) Filed: Nov. 12, 2003

(65) Prior Publication Data

US 2004/0104362 A1    Jun. 3, 2004

(30) Foreign Application Priority Data

Nov. 14, 2002  (JP)  ............................. 2002-330696

(51) Int. Cl.
 *A61B 6/00* (2006.01)
 *G01N 23/04* (2006.01)

(52) U.S. Cl. .................................................... 250/582
(58) Field of Classification Search ................ 250/582, 250/583, 584
See application file for complete search history.

(56) References Cited

U.S. PATENT DOCUMENTS

| 4,835,386 A * | 5/1989 | Shimura et al. ............ 250/582 |
| 6,268,614 B1 * | 7/2001 | Imai ............................ 250/591 |
| 2003/0222233 A1 * | 12/2003 | Imai ............................ 250/591 |

* cited by examiner

*Primary Examiner*—David Porta
*Assistant Examiner*—Kristie Watson
(74) *Attorney, Agent, or Firm*—Sughrue Mion, PLLC

(57) ABSTRACT

An image recording medium for recording image information by storing electric charges generated in response to exposure to an electromagnetic wave carrying the image information. The image recording medium includes: an electrode transparent to the electromagnetic wave; a recording-side photoconductive layer which contains a-Se as a main component, and generates electric charges when exposed to the electromagnetic wave; and a suppression layer which is arranged between the electrode and the recording-side photoconductive layer, and suppresses interfacial crystallization in the recording-side photoconductive layer. The suppression layer is made of an organic material which behaves as an insulator against electric charges having the opposite polarity to electric charges which move from the recording-side photoconductive layer to the electrode at the time of recording, and as a conductor of charges having the same polarity as the electric charges which move to the electrode.

6 Claims, 3 Drawing Sheets

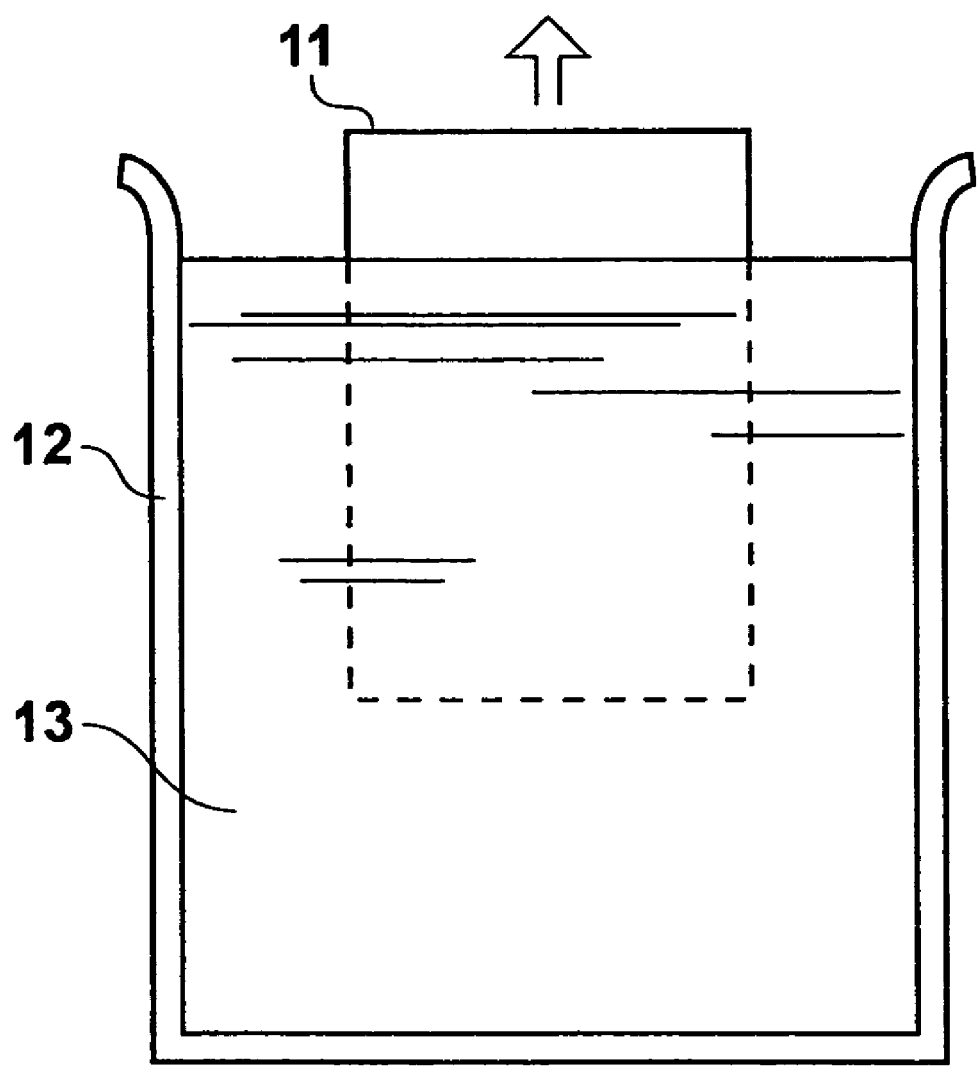

IMAGE RECORDING MEDIUM HAVING SUPPRESSION LAYER FOR SUPPRESSING INTERFACIAL CRYSTALLIZATION

BACKGROUND OF THE INVENTION

1. Field of the Invention

The present invention relates to an image recording medium which records image information by storing electric charges generated in a recording-side photoconductive layer in response to irradiation with a recording electromagnetic wave carrying the image information.

2. Description of the Related Art

U.S. Pat. No. 6,268,614 issued to the present inventor (Shinji Imai) and corresponding to Japanese Patent Applications Nos. 10-215378 and 10-232824 (which are laid open as Japanese Unexamined Patent Publication No. 2000-105297) discloses information related to the present invention.

Conventionally, radiographic-image recording mediums which record radiographic images by storing in a charge storage region electric charges the amounts of which respectively correspond to doses of radiation such as an X-ray are used in many applications such as medical radiography, and various types of radiographic-image recording mediums basically operating as above have been proposed. In each of the above radiographic-image recording mediums, information on the radiographic image recorded in the radiographic-image recording medium can be read out by scanning the radiographic-image recording medium with a spot light beam or a light beam having a linearly-shaped cross section.

In the aforementioned reference, the present inventor has proposed a radiographic-image recording medium which can concurrently realize quick response in reading and efficient readout of signal charges. In the proposed radiographic-image recording medium, a first electrode layer, a recording-side photoconductive layer, a charge transportation layer, a reading-side photoconductive layer, and a second electrode layer, where the first electrode layer allows radiation for recording to pass through, the recording-side photoconductive layer becomes conductive when the recording-side photoconductive layer is exposed to the radiation for recording, the charge transport layer behaves substantially as an insulator against latent-image charges and substantially as a conductor for charges having the opposite polarity to the latent-image polarity, the reading-side photoconductive layer exhibits conductivity when the reading photoconductive layer is exposed to an electromagnetic wave for reading (reading electromagnetic wave), and the second photoconductive layer allows the reading electromagnetic wave to pass through. Thus, when the radiographic-image recording medium is irradiated through the first electrode layer with the radiation for recording, a radiographic image is recorded by storing in a charge storage region electric charges the amounts of which correspond to the doses of the radiation. The charge storage region is formed substantially at an interface between the recording-side photoconductive layer and the charge transport layer.

In the above radiographic-image recording medium, the recording-side photoconductive layer directly receives the irradiation. However, the aforementioned reference has further proposed a radiographic-image recording medium in which a wavelength conversion layer is added to the construction described above. The wavelength conversion layer is arranged on the side near the first electrode layer, and contains a fluorescent material which emits visible light when irradiated with the radiation for recording. Thus, the radiation for recording irradiated on the radiographic-image recording medium is converted to visible light in the wavelength conversion layer, and the recording-side photoconductive layer is illuminated with the visible light. When the recording-side photoconductive layer receives the visible light, electric charges are generated in the recording-side photoconductive layer, and stored in the charge storage region. In this case, it is possible to enhance the efficiency in generation of electric charge pairs in the recording-side photoconductive layer, and reduce the dose of radiation which is necessary to expose the recording-side photoconductive layer and the dose of radiation to which a subject (a patient) is exposed.

In the above radiographic-image recording mediums, a DC voltage is applied between the first and second electrode layers so that the first electrode layer is at a negative potential, and the second electrode layer is at a positive potential. At the same time, radiation which has passed through the subject is irradiated on the radiographic-image recording medium through the first electrode layer, so that a radiographic image of the subject is recorded as an electrostatic latent image by storing in the charge storage region negative charges generated in the recording-side photoconductive layer in response to exposure to the radiation which has passed through the first electrode layer.

Then, the application of the above DC voltage is stopped, and the electric charges in the radiographic-image recording medium are rearranged by short-circuiting the first and second electrode layers. Thereafter, when an electromagnetic wave for reading is irradiated on the radiographic-image recording medium through the second electrode layer, the reading photoconductive layer is exposed to the electromagnetic wave which has passed through the second electrode layer, and therefore pairs of electric charges are generated in the reading photoconductive layer. At this time, positive charges in the pairs of electric charges pass through the charge transport layer, and are combined with negative charges stored in the charge storage region, and negative charges in the pairs of electric charges are combined with positive charges stored in the second electrode layer. Thus, discharge occurs, and the latent image is read out by detecting variations in voltages generated between the first and second electrode layers, as variations in currents, by a current detection amplifier or the like.

Incidentally, in many cases, the recording-side photoconductive layers in the radiographic-image recording mediums as described above are made of a-Se (amorphous selenium), since a-Se realizes high dark resistance and response speed. However, for example, in the case where the first electrode layer is formed on a surface of the recording-side photoconductive layer which is formed beforehand, crystallization progresses at the interface between the first electrode layer and the recording-side photoconductive layer made of a-Se, due to heat generated during a vapor deposition process for formation of the first electrode layer or contact between a material of which the first electrode layer is made and the recording-side photoconductive layer made of a-Se. Since the interfacial crystallization increases electric charges which are injected from the first electrode layer when information on a radiographic image is recorded, and the injected electric charges cause noise, the interfacial crystallization lowers the S/N ratio. When the first electrode layer is realized by a transparent oxide film, especially of ITO (indium tin oxide) or IZO (indium zinc oxide), the crystallization remarkably progresses at the interface between the material of which the first electrode layer is made and the recording-side photoconductive layer made of a-Se.

Therefore, in order to prevent the above problem caused by the interfacial crystallization in the recording-side photoconductive layer, the present inventor has proposed an arrangement of a suppression layer between the first electrode layer (through which recording light is applied) and the recording-side photoconductive layer, where the suppression layer is made of an organic polymer which suppresses interfacial crystallization in Japanese Patent Application No. 2001-73376 (which was laid open on Nov. 15, 2002 as Japanese Unexamined Patent Publication No. 2002-329848).

Nevertheless, in the case where the suppression layer made of an organic polymer is used, when operations of recording radiographic images with high radiation doses and reading the radiographic images are repeated, electric charges remain in the suppression layer, and cause problems which include deterioration of sensitivity and remaining of ghost images.

SUMMARY OF THE INVENTION

The present invention has been developed in view of the above circumstances.

It is an object of the present invention to provide an image recording medium which has a recording-side photoconductive layer generating electric charges in response to exposure to radiation and a suppression layer suppressing interfacial crystallization in the recording-side photoconductive layer, and in which sensitivity does not deteriorate and ghost images do not remain.

In order to accomplish the above object, the present invention provides an image recording medium for recording image information by storing electric charges which are generated in response to exposure to an electromagnetic wave carrying the image information. The image recording medium comprises: an electrode which is transparent to the electromagnetic wave; a recording-side photoconductive layer which contains a-Se as a main component, and generates electric charges when the recording-side photoconductive layer is exposed to the electromagnetic wave; and a suppression layer which is arranged between the electrode and the recording-side photoconductive layer, and suppresses interfacial crystallization in the recording-side photoconductive layer. The suppression layer is a film of an organic material which behaves as an insulator against electric charges having the opposite polarity to electric charges which move from the recording-side photoconductive layer to the electrode when the image information is recorded, and as a conductor of charges having the same polarity as the electric charges which move from the recording-side photoconductive layer to the electrode when the image information is recorded.

The above electromagnetic wave is, for example, radiation such as an X-ray, or light emitted from a fluorescent material which is irradiated with an X-ray.

Since, in the image recording medium according to the present invention, the suppression layer arranged between the electrode and the recording-side photoconductive layer is a film of an organic material which behaves as an insulator against electric charges having the opposite polarity to electric charges which move from the recording-side photoconductive layer to the electrode when the image information is recorded, and as a conductor of charges having the same polarity as the electric charges which move from the recording-side photoconductive layer to the electrode when the image information is recorded, it is possible to reduce electric charges which remain in the suppression layer when operations of recording radiographic images with high radiation doses and reading the radiographic images are performed. Therefore, it is possible to prevent deterioration of sensitivity and remaining of ghost images.

Preferably, the image recording medium according to the present invention may also have one or any possible combination of the following additional features (i) to (iii).

(i) The suppression layer has a thickness of 0.05 to 5 micrometers. In this case, it is possible to appropriately prevent interfacial crystallization, and realize appropriate transportation of electric charges.

(ii) The suppression layer is made of poly N-vinyl carbazole.

(iii) The suppression layer is made of an insulating organic polymer in which N,N'-diphenyl-N,N'-bis(3-methylphenyl)-[1,1'-biphenyl]-4,4'-diamine is dispersed. The organic polymer is, for example, a low-water-content (water-insoluble) polymer such as polycarbonate, polystyrene, polymethyl methacrylate, polyvinyl acetate, or polyvinyl chloride.

In the cases (ii) and (iii), it is possible to easily form the suppression layer. In addition, since methylene chloride can be used as a solvent, and the boiling point of methylene chloride is low, it is possible to form the film at low temperature, and suppress interfacial crystallization in the recording-side photoconductive layer, which occurs at high temperature.

BRIEF DESCRIPTION OF THE DRAWINGS

FIG. 2 is an explanatory diagram illustrating a process for forming a suppression layer in the radiographic-image recording medium of FIG. 1.

DESCRIPTION OF PREFERRED EMBODIMENTS

Embodiments of the present invention are explained in detail below with reference to drawings.

First Embodiment

Figure 1A:
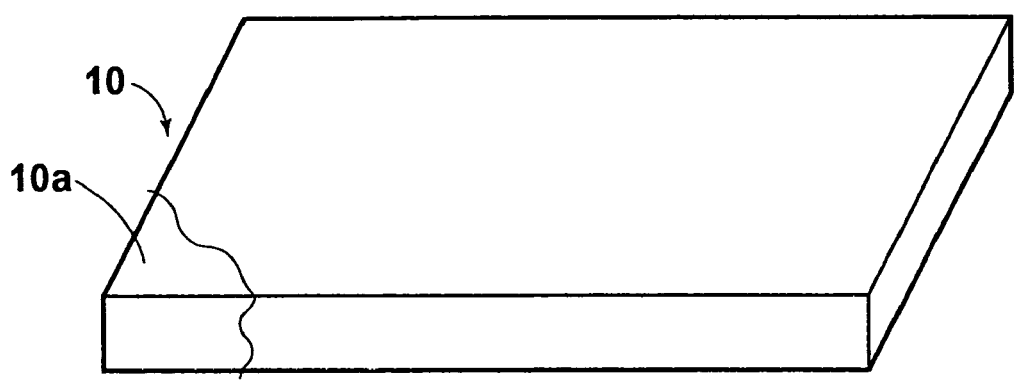
FIG. 1A is a perspective view of a radiographic-image recording medium as a first embodiment of the image recording medium according to the present invention.
Figure 1B:
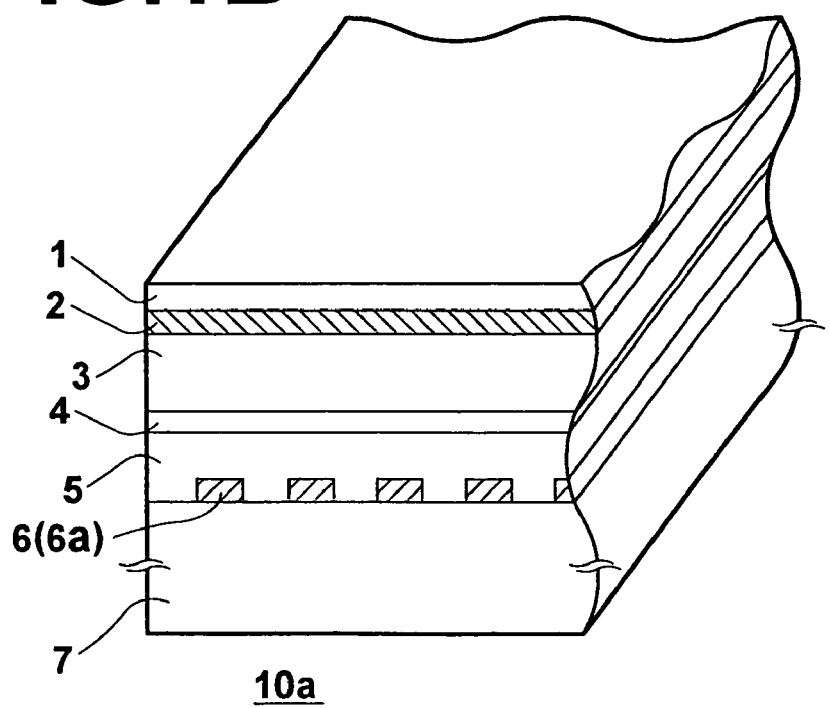
FIG. 1B is a magnified perspective view of a cutaway portion of the radiographic-image recording medium of FIG. 1A, where a cross section of the cutaway portion is illustrated.

FIG. 1A is a perspective view of a radiographic-image recording medium as a first embodiment of the image recording medium according to the present invention, and FIG. 1B is a magnified perspective view of a cutaway portion 10a of the radiographic-image recording medium 10 of FIG. 1A, where a cross section of the cutaway portion 10a is illustrated.

The radiographic-image recording medium 10 illustrated in FIGS. 1A and 1B comprises a first electrode layer 1, a suppression layer 2, a recording-side photoconductive layer 3, a charge storage region 4, a reading-side photoconductive layer 5, a second electrode layer 6, and a substrate 7 are arranged in this order.

The first electrode layer 1 is transparent to radiation for recording. The suppression layer 2 is arranged between the first electrode layer 1 and the recording-side photoconductive layer 3, and prevents interfacial crystallization in the recording-side photoconductive layer 3. The recording-side photoconductive layer 3 exhibits conductivity in response to exposure to the radiation which has passed through the first electrode layer 1 and the suppression layer 2. The charge storage region 4 arranged between the recording-side photoconductive layer 3 and the reading-side photoconductive layer 5 stores electric charges which are generated in the recording-side photoconductive layer 3 and have a latent-image polarity. The reading-side photoconductive layer 5 exhibits conductivity in response to exposure to reading light. The second electrode layer 6 and the substrate 7 are transparent to the reading light.

In addition, the substrate 7 can be deformed in correspondence with variations in the environmental temperature. Further, the thermal expansion coefficient of the substrate 7 is not less than a fraction of the thermal expansion coefficient of the reading-side photoconductive layer 5 and not more than several times the thermal expansion coefficient of the reading-side photoconductive layer 5. Preferably, the substrate 7 and the reading-side photoconductive layer 5 are made of materials having thermal expansion coefficients relatively close to each other.

The first electrode layer 1 and the second electrode layer 6 may be made of any material which is transparent to the radiation for recording and the reading light, respectively, and for example, an $SnO_2$ film (which is known as a NESA film), an ITO (indium tin oxide) film, a film of IDIXO (Idemitsu Indium X-metal Oxide), or the like, where IDIXO is a transparent amorphous oxide, and manufactured by Idemitsu Kosan Co., Ltd. In this case, the thicknesses of the first electrode layer 1 and the second electrode layer 6 are, for example, 50 to 200 nm. Alternatively, the first electrode layer 1 may be made of aluminum or gold. In this case, the thickness of the first electrode layer 1 is, for example, 100 nm.

The second electrode layer 6 is realized by a striped electrode array comprised of a plurality of elements (linear electrodes) 6a which are formed with a pitch corresponding to a pixel pitch. In the radiographic-image recording medium 10 illustrated in FIGS. 1A and 1B, no insulator is arranged between the plurality of elements 6a, and the gaps between the plurality of elements 6a are filled with the reading-side photoconductive layer 5. That is, the second electrode layer 6 is realized by only the plurality of electrodes 6a. Alternatively, it is possible to fill the gaps between the plurality of elements 6a with an insulator.

In addition, the first electrode layer 1 can also be realized by a striped electrode array formed in a similar manner to the second electrode layer 6.

The recording-side photoconductive layer 3 may be made of any material which exhibits conductivity when the recording-side photoconductive layer 3 is irradiated with the radiation. In this example, the main component of recording-side photoconductive layer 3 is a-Se, which is superior in high dark resistance and relatively high quantum efficiency with respect to radiation. Preferably, the thickness of the recording-side photoconductive layer 3 is about 500 micrometers.

The charge storage region 4 is a trap layer made of $As_2Se_3$, and the electric charges generated in the recording-side photoconductive layer 3 are stored in the charge storage region 4. Preferably, the thickness of the charge storage region 4 is about 0.1 micrometers. Alternatively, it is possible to provide a charge transport layer instead of providing the charge storage region. The charge transport layer behaves substantially as an insulator against electric charges which are generated in the recording-side photoconductive layer 3 and move to the charge transport layer, and substantially as a conductor of transport charges having the opposite polarity to the electric charges generated in the recording-side photoconductive layer.

The reading-side photoconductive layer 5 may be made of any material which exhibits conductivity when the reading-side photoconductive layer 5 is illuminated with the reading light. For example, it is preferable that the reading-side photoconductive layer 5 is made of a photoelectric material containing as a main component at least one of a-Se, Se—Te, Se—As—Te, nonmetallic phthalocyanine, metallic phthalocyanine, MgPc (magnesium phthalocyanine), VoPc (phase II of vanadyl phthalocyanine), CuPc (copper phthalocyanine), and the like. In addition, it is preferable that the thickness of the reading-side photoconductive layer 5 is about 10 micrometers.

The suppression layer 2 is provided for preventing interfacial crystallization in the recording-side photoconductive layer 3 at the time of formation of the first electrode layer 1 over the recording-side photoconductive layer 3 by vapor deposition, where the interfacial crystallization can be caused by heat generated during vapor deposition or contact with the first electrode layer 1, in the conventional image recording mediums. In this embodiment, the suppression layer 2 is made of such an organic polymer that a film of the suppression layer 2 can be formed by coating at low temperature.

At the time of recording of a radiographic image, a high, negative voltage is applied to the first electrode layer 1. Then, positive charges generated in the recording-side photoconductive layer 3 move through the suppression layer 2 to the first electrode layer 1, and are combined with negative charges in the first electrode layer 1. Therefore, when the operations of recording radiographic images as above are repeated, positive charges can remain in the suppression layer 2, and cause deterioration of sensitivity or remaining of ghost images. Thus, according to the present embodiment, the suppression layer 2 is made of a material which behaves as an insulator against negative charges (i.e., electric charges having the same polarity as the voltage applied to the first electrode layer 1), and as a conductor of positive charges (i.e., electric charges having the opposite polarity to the voltage applied to the first electrode layer 1). For example, the suppression layer 2 can be made of an organic polymer which can transport positive holes, for example, poly N-vinyl carbazole (PVK). Alternatively, the suppression layer 2 can be made of an insulating organic polymer in which a low-molecular positive-hole transporter is dispersed. In this case, the insulating organic polymer is, for example, polycarbonate, polystyrene, polyvinyl acetate, or polyvinyl chloride, the low-molecular positive-hole transporter is, for example, N,N'-diphenyl-N,N'-bis(3-methylphenyl)-[1,1'-biphenyl]-4,4'-diamine (TPD), and the appropriate concentration of the low-molecular positive-hole transporter is about 1 to 10%. In addition, a low boiling-point solvent, methylene chloride, is used as a solvent of the organic polymer. Instead of the methylene chloride, other chlorinated hydrocarbons or fluorides can be used. For example, the chlorinated hydrocarbons which can be used as a solvent of the above organic polymer include chloroform, 1,1-dichloroethane, and 1,2- dichloroethylene, and the fluorides which can be used as a solvent of the above organic polymer include 1,1-dichloro-1-fluoroethane and 1,1,2-trichlorotrifluoroethane.

The method for applying the organic polymer for formation of the suppression layer 2 is, for example, dipping, spraying, bar coating, or screen coating.

FIG. 2 is an explanatory diagram illustrating a process for forming the suppression layer in the radiographic-image recording medium of FIG. 1. In the method illustrated in FIG. 2, a container 12 is filled with a material solution 13 in which PVK (poly N-vinyl carbazole) is dissolved in methylene chloride as a solvent. Then, a member 11 in which the second electrode layer 6, the reading-side photoconductive layer 5, the charge storage region 4, and the recording-side photoconductive layer 3 are formed on the substrate 7 in this order is dipped into the material solution 13, and is then lifted from the member 11. Even when the size of the member 11 (i.e., the size of the radiographic-image recording medium 10) is large, the above method can be used by simply providing a container 12 having a size corresponding to the size of the member 11. In addition, the thickness of the suppression layer 2 can be adjusted by appropriately controlling the lifting speed and the concentration of the solution. Therefore, it is possible to easily form the suppression layer 2 with an arbitrary thickness even when the member 11 has a great size.

Although the power of suppressing interfacial crystallization increases with increase in the thickness of the suppression layer 2, the charge transportability deteriorates with increase in the thickness of the suppression layer 2. Therefore, the thickness of the suppression layer 2 is preferably 0.05 to 5 micrometers, and more preferably 0.1 to 0.5 micrometers.

Further, in the case where the suppression layer 2 is made of the organic polymer such as PVK, the suppression layer 2 can be easily separated from the recording-side photoconductive layer by dipping the radiographic-image recording medium 10 again, in a solvent. Therefore, the metal materials contained in the electrodes, such as a-Se and Au, can be recycled.

In the above radiographic-image recording medium 10 according to the first embodiment, electric charges are generated in the recording-side photoconductive layer 3 when the recording-side photoconductive layer 3 is directly irradiated with radiation for recording, and a radiographic image is recorded by storing the electric charges. That is, the radiographic-image recording medium 10 according to the first embodiment is an image recording medium of the so-called direct-conversion type. However, the present invention can also be applied to image recording mediums of the so-called indirect-conversion type.

Second Embodiment

Figure 3A:
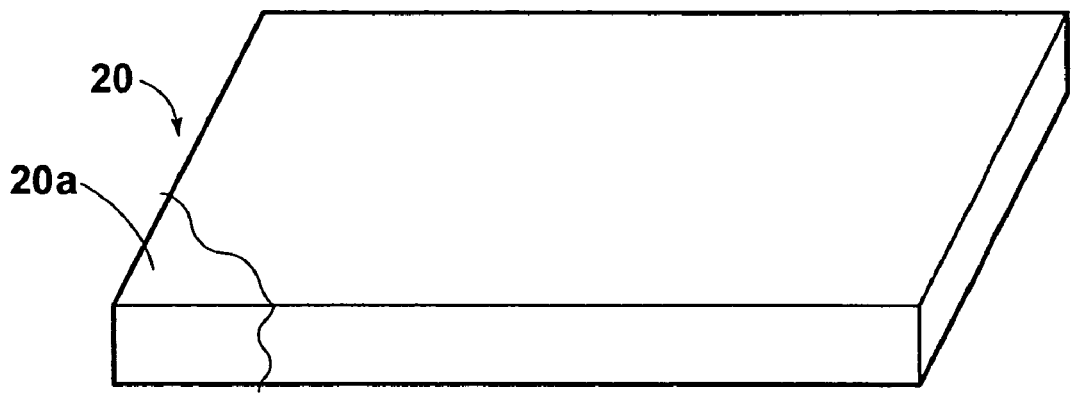
FIG. 3A is a perspective view of a radiographic-image recording medium as a second embodiment of the image recording medium according to the present invention.
Figure 3B:
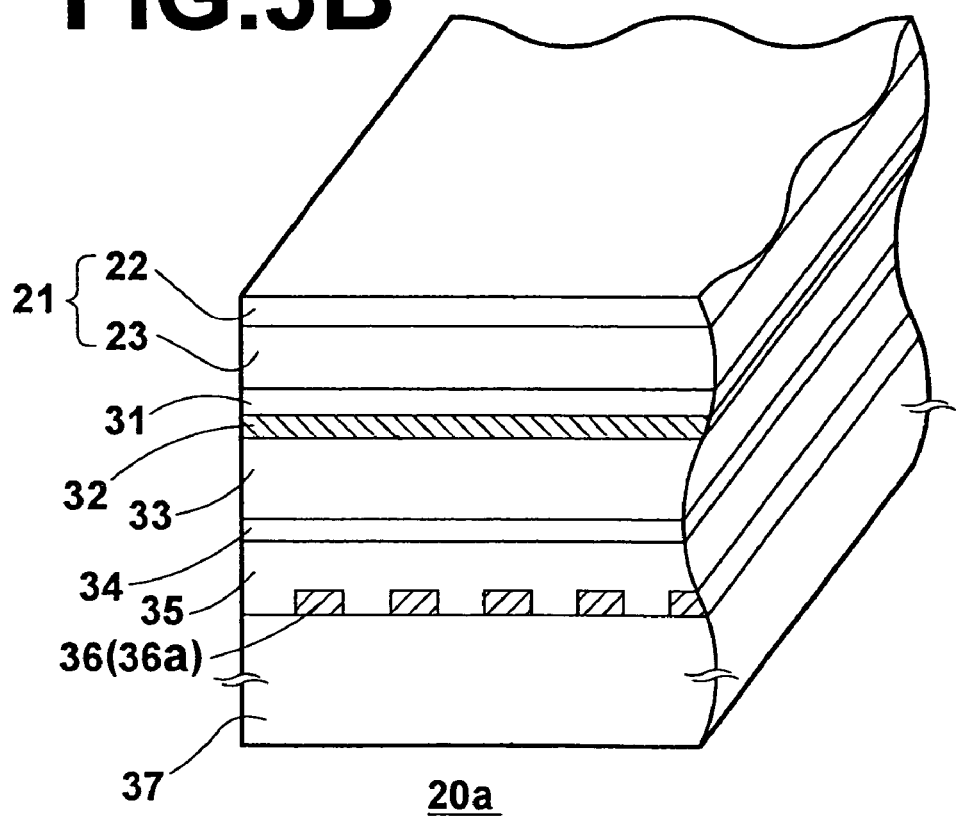
FIG. 3B is a magnified perspective view of a cutaway portion of the radiographic-image recording medium of FIG. 3A, where a cross section of the cutaway portion is illustrated.

FIG. 3A is a perspective view of a radiographic-image recording medium of an indirect-conversion type according to the second embodiment of the image recording medium according to the present invention, and FIG. 3B is a magnified perspective view of a cutaway portion 20a of the radiographic-image recording medium 20 of FIG. 3A, where a cross section of the cutaway portion 20a is illustrated.

The radiographic-image recording medium 20 illustrated in FIGS. 3A and 3B comprises a fluorescent layer 21, a first electrode layer 31, a suppression layer 32, a recording-side photoconductive layer 33, a charge storage region 34, a reading-side photoconductive layer 35, a second electrode layer 36, and a substrate 37 are arranged in this order.

The fluorescent layer 21 contains a fluorescent material which converts radiation (for recording) into visible light. The first electrode layer 31 is transparent to the visible light emitted from the fluorescent layer 21. The suppression layer 32 is arranged between the first electrode layer 31 and the recording-side photoconductive layer 33, and prevents interfacial crystallization in the recording-side photoconductive layer 33. The recording-side photoconductive layer 33 exhibits conductivity in response to exposure to the visible light which has passed through the first electrode layer 31 and the suppression layer 32. The charge storage region 34 arranged between the recording-side photoconductive layer 33 and the reading-side photoconductive layer 35 stores electric charges which are generated in the recording-side photoconductive layer 33 and have a latent-image polarity. The reading-side photoconductive layer 35 exhibits conductivity in response to exposure to reading light. The second electrode layer 36 and the substrate 37 are transparent to the reading light.

The fluorescent layer 21 is realized by stacking a support 22 and a wavelength conversion layer 23 in this order. The support 22 is transparent to the radiation for recording, and the wavelength conversion layer 23 contains an organic binder and the fluorescent material which converts the radiation for recording into the visible light. In this example, the support 22 may be realized by a sheet of resin such as polyimide or polyethylene, and the fluorescent material in the fluorescent layer 21 is a material which converts radiation into visible light in the blue wavelength range, and is, for example, $CaWO_4$, $LaOBr:Tm$, $BaFCl:Eu$, or $YTaO_4:Nb$. In addition, the organic binder may be a resin binder such as polyvinyl alcohol. The fluorescent layer 21 can be produced by mixing the fluorescent material into an aqueous solution of polyvinyl alcohol so as to produce a slurry, applying the slurry to the support 22, and drying the slurry. Further, preferably, the thickness of the fluorescent layer 21 is about 200 micrometers.

The recording-side photoconductive layer 33 is made of a material which exhibits conductivity when the recording photoconductive layer 33 is illuminated with the blue light generated in the fluorescent layer 21, and a-Se is appropriate for the material for the recording photoconductive layer 33, since a-Se can convert light in the wavelength range of 360 to 460 nm into electric charges with high quantum efficiency, and has a thermal expansion coefficient close to that of the support 22. In addition, the appropriate thickness of the recording photoconductive layer 33 is about 10 micrometers.

The first electrode layer 31 is required to be made of a material which is transparent to the visible light generated in the fluorescent layer 21. For example, the first electrode layer 31 is made of an $SnO_2$ film (NESA film), an ITO (indium tin oxide) film, or a film of IDIXO (Idemitsu Indium X-metal Oxide).

The constructions of the other portions of the radiographic-image recording medium 20 are respectively similar to the corresponding portions of the radiographic-image recording medium 10.

Advantages

In the radiographic-image recording mediums according to the first and second embodiments, in order to prevent interfacial crystallization in the recording-side photoconductive layer 33, the suppression layer 32 is arranged between the first electrode layer 31 and the recording-side photoconductive layer 33, and the suppression layer 32 is realized by a film of an organic material which behaves as an insulator against electric charges having the opposite polarity to the polarity of the electric charges which move to the first electrode layer 31 at the time of recording of image information, and as a conductor of electric charges having the same polarity as the electric charges which move to the first electrode layer 31 at the time of recording of image information. Therefore, it is possible to reduce electric charges which remain in the suppression layer 32 after recording and reading of radiographic images with high radiation doses. Therefore, it is possible to prevent deterioration of sensitivity and remaining of ghost images.

Variations and Other Matters (i) In the first and second embodiments, a negative voltage is applied to the first electrode layer 1 or 31 at the time of recording of a radiographic image, and therefore the suppression layer 2 or 32 is made of a material which behaves as an insulator against negative charges, and as a conductor of positive charges. On the other hand, in the case where a positive voltage is applied to the first electrode layer 1 or 31 at the time of recording of a radiographic image, the suppression layer 2 or 32 should be made of a material which behaves as an insulator against positive charges, and as a conductor of negative charges. In this case, for example, the suppression layer 2 or 32 may be made of polystyrene in which trinitrofluorenone (TNF) is dispersed.

(ii) When a region in a vicinity of the boundary between the suppression layer 2 or 32 and the recording-side photoconductive layer 3 or 33 in the radiographic-image recording medium according to each of the first and second embodiments is doped with As or Cl, it is possible to further effectively suppress the interfacial crystallization.

(iii) In the radiographic-image recording medium according to each of the first and second embodiments, it is possible to arrange another suppression layer, which is similar to the suppression layer 2 or 32, between the reading-side photoconductive layer 5 or 35 and the second electrode layer 6 or 36. In this case, when the organic polymer is applied in the length direction of the plurality of element 6*a* or 36*a*, it is possible to form a suppression layer having a uniform thickness. Further, a region in a vicinity of the boundary between the reading-side photoconductive layer 5 or 35 and the second electrode layer 6 or 36 may be doped with As.

(iv) All of the contents of the Japanese patent application, No. 2002-330696 are incorporated into this specification by reference.

What is claimed is:

1. An image recording medium for recording image information by storing electric charges which are generated in response to exposure to an electromagnetic wave carrying the image information, comprising:
    an electrode which is transparent to said electromagnetic wave;
    a recording-side photoconductive layer which contains a-Se as a main component, and generates electric charges when the recording-side photoconductive layer is exposed to said electromagnetic wave; and
    a suppression layer which is arranged between said electrode and said recording-side photoconductive layer, and suppresses interfacial crystallization in the recording-side photoconductive layer;
    wherein said suppression layer is a film made of an organic material which behaves as an insulator against electric charges having an opposite polarity to electric charges which move from the recording-side photoconductive layer to the electrode when the image information is recorded, and as a conductor of charges having an identical polarity to the electric charges which move from the recording-side photoconductive layer to the electrode when the image information is recorded.

2. An image recording medium according to claim 1, wherein said suppression layer has a thickness of 0.05 to 5 micrometers.

3. An image recording medium according to claim 1, wherein said suppression layer is made of poly N-vinyl carbazole.

4. An image recording medium according to claim 2, wherein said suppression layer is made of poly N-vinyl carbazole.

5. An image recording medium according to claim 1, wherein said suppression layer is made of an insulating organic polymer in which N,N'-diphenyl-N,N'-bis-(3-methylphenyl)-[1,1'-biphenyl]-4,4'-diamine is dispersed.

6. An image recording medium according to claim 2, wherein said suppression layer is made of an insulating organic polymer in which N,N'-diphenyl-N,N'-bis-(3-methylphenyl)-[1,1'-biphenyl]-4,4'-diamine is dispersed.

* * * * *